other end of the wedging system is not sufficient to overcome the friction then existing between the wedge members H and the innermost plates E. Consequently, the maximum of wedging or spreading pressure is set up in the mechanism prior to movement of any of the movable friction plates and thereafter the wedging pressure remains uniform so that the resistance of the mechanism as an entirety is rendered strictly proportional to the load applied. By this arrangement of parts, all danger of excessive pressure on any part is avoided and long life thereby insured. As will be obvious to those skilled in the art, the maximum of the wedging or spreading pressure can be varied to accord with the desires of the manufacturer or user by changing the wedging angles, the normal space between the follower M and plates E and spring characteristics. Notwithstanding the limit of wedging or spreading pressure imposed by the arrangement described, the total capacity is unusually high and sufficient for the heavy duty required in present railroad service.

During release, upon discontinuance of the actuating force, the wedge G is initially squeezed outwardly from between the other wedge members H which action is readily permitted because of the anti-friction rollers K. In this way, the wedging or spreading force is immediately reduced to a minimum, thereby permitting the spring to expand sufficiently to shift the wedge members H outwardly relatively to the innermost friction plates E and until the spring follower C engages the inner ends of all of the movable plates, the latter being thereafter pushed outwardly simultaneously with the wedging system. As will be understood by those skilled in the art, the action of the mechanism under draft is the same as above described, except in an opposite direction.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a casing; of a series of longitudinally extending friction elements held by said casing against movement longitudinally relatively thereto but adapted for lateral shifting; a second series of longitudinally extending friction elements alternated with those of the first series and adapted for movement longitudinally relatively thereto; a spring resistance; a follower outside said casing adapted to move said friction elements of the second series longitudinally relatively to those of the first series; and wedge-pressure-transmitting means interposed between said follower and said spring resistance including, an outer member actuated by said follower and having a wedge face, a second inner member having its inner end resisted by said spring resistance and provided with a cooperating wedge face, and anti-friction means interposed between said wedge faces, said second inner member having frictional engagement with one of said friction elements and temporarily immovable with respect thereto during the initial portion of a compression stroke and while the first named outer wedge member is advanced longitudinally relatively thereto, both said wedge members being thereafter advanced a short distance relatively to said friction element, the follower, said wedge-pressure-transmitting means and friction elements of said second named series thereafter moving simultaneously and uniformly.

2. In a friction shock absorbing mechanism, the combination with a casing; of a series of longitudinally extending friction elements held by said casing against movement longitudinally relatively thereto but adapted for lateral shifting; a second series of longitudinally extending friction elements alternated with those of the first series and adapted for movement longitudinally relatively thereto; a spring resistance; a follower outside said casing adapted to move said friction elements of the second series longitudinally relatively to those of the first series; and wedge-pressure-transmitting means interposed between said follower and said spring resistance including, an outer member actuated by said follower and having a wedge face, a second inner member having its inner end resisted by said spring resistance and provided with a cooperating wedge face, and anti-friction means interposed between said wedge faces, said second inner member having frictional engagement with one of said friction elements and temporarily immovable with respect thereto during the initial portion of a compression stroke and while the first named outer wedge member is advanced longitudinally relatively thereto, both said wedge members being thereafter advanced a short distance relatively to said friction elements, the follower, said wedge-pressure-transmitting means and friction element of said second named series thereafter moving simultaneously and uniformly, the friction element frictionally engaged by said inner wedge member being one of those of the second named series.

3. In a friction shock absorbing mechanism, the combination with a casing; of a series of longitudinally extending friction plates mounted in and held by said casing against movement longitudinally relatively thereto, but responsive to lateral pressure; a second series of longitudinally arranged Patented Mar. 13, 1923.

1,448,494

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed April 6, 1921. Serial No. 459,068.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

As is well known by those skilled in the art of railway draft riggings, the space within which the shock absorbing mechanism proper is accommodated is very strictly limited by rules and regulations of standardization, the present practice limiting such space to a length of 24⅝", a width between draft sills of 12⅞" a height of approximately 9" and a compression stroke or movement of preferably 2¾". Notwithstanding the restricted space allowed for shock absorbing mechanisms for railway draft riggings, manufacturers are compelled to provide shock absorbing mechanisms which must withstand more severe service conditions from year to year. Service conditions have become very much more severe as compared with those of a few years ago due to the constant increase in the size of cars, the increase in load per car, the gradual increase in length of train, the increase in tractive effort and speed of locomotives, and the greater speed demanded in switching cars at hump yards. In meeting the conditions imposed by gradually changing service requirements, manufacturers have resorted to friction shock absorbing mechanisms. Due to the restricted space in which such mechanisms are contained, there is necessarily a limit to the amount of material which can be employed and heretofore, the greater capacity of such shock absorbing mechanisms has been obtained by gradually increasing the stress on the friction elements to obtain greater friction. Obviously there is a limit to which metals can be stressed without danger of destruction and, furthermore, on account of the necessity of an instantaneous release of the mechanism after a compression stroke, great care must be exercised to avoid increases of stresses and friction to an extent that will militate against a proper release. While, theoretically, it is possible to obtain any desired frictional capacity to resist a shock during a compression stroke, it is just as essential for a commercially successful mechanism to be able to release instantaneously and restore the parts to normal position without danger of sticking for the reason that the mechanism may be subjected to rapid successive shocks either in the same direction or alternate directions and if a mechanism did not release instantaneously upon the discontinuance of one blow, the next successive blow would not be cushioned but instead would be transmitted through a solid column to the underframe of the car with consequent destruction. Another essential factor with any practical shock absorbing mechanism for railway draft riggings is a comparatively low "ultimate load" transmitted to the draft sills and underframe of the car. In other words, while a shock absorbing mechanism may absorb a heavy blow or do work corresponding to many thousand foot pounds, nevertheless, such work performed must be distributed as uniformly as possible over the entire compression stroke so as to avoid any undue "peak" in the performance of the work since any undue peak or ultimate load transmitted to the draft sills and underframe of the car will very quickly destroy the latter.

It is further recognized in the art that shock absorbing mechanisms must be designed to withstand successfully the maximum loads to which they may become subject from time to time but that such maximum loads constitute only a comparatively small percentage of the total number of blows or shocks to which the mechanism is subject over any reasonable period of time. That is to say, while a shock absorbing mechanism may be subject to one very severe load, it will probably be subject to fifty to seventy-five much lighter blows. It therefore follows that a mechanism, to be entirely successful commercially must not only successfully withstand the heavy or maximum loads, but also provide an easy cushioning action for smaller loads or, stated in another manner, must not be stiff in its action under either light or heavy shocks.

One object of my invention is to provide a shock absorbing mechanism of the spring friction type which is especially adapted for service in railway draft riggings, which complies with the standardized restrictions governing space allowed for it on a car and stroke, which is of exceedingly high shock absorbing capacity, which is provided with a larger amount of frictional wearing areas than any prior successfully operative device of this general character, so far as I am aware, which maintains the pressure on the frictional surfaces at a comparatively small minimum per unit of area to thereby insure long life, which provides for an instantaneous full release, and which insures the ultimate load transmitted to the sills being confined within such limits as to prevent destruction of the underframe structure of the car.

Another object of the invention is to provide a mechanism of the character above indicated wherein are employed wedging or pressure-creating devices in conjunction with co-operating friction elements, the wedging or pressure-creating devices being such that they are anti-frictionally mounted with respect to the friction elements and with respect to each other.

Another object of the invention is to provide a friction shock absorbing mechanism of the type above indicated wherein are employed a plurality of alternated or intercalated relatively stationary and movable friction elements arranged in a single group in combination with pressure-creating means cooperable therewith and so arranged as to increase the pressure on the friction elements by means of opposed inwardly directed forces, during a compression stroke.

Other more specific objects of the invention relate to certain details of construction directed toward reducing the cost of manufacture, cost of assembling, and wearing qualities, as will more clearly appear from the description hereinafter following.

In the drawings forming a part of this specification, Figure 1 is a horizontal, longitudinal, sectional view of a portion of a railway draft rigging showing one embodiment of my invention in connection therewith, the condition of the parts corresponding to normal or full release of the shock absorbing mechanism. Figures 2 and 3 are vertical, transverse, sectional views corresponding substantially to the lines 2—2 and 3—3 respectively of Figure 1, Figure 3 being upon a larger scale than Figure 2 and being confined solely to the shock absorbing mechanism itself. In Figures 7 and 8, parts of the mechanism are broken away to avoid crowding on the sheet.

Referring first to the construction illustrated in Figures 1 to 6, inclusive, 10—10 denote channel draft sills of a railway car underframe to the inner faces of which are secured front stop lugs 11—11 and rear stop lugs 12—12 spaced the standard distance apart and which may be of any desired form. The inner end of a standard drawbar is indicated at 13, the same being operatively connected with the shock absorbing mechanism proper by a hooded, single pocket, cast yoke 14 and coupler key 15, the latter being extended through suitable elongated slots in the draft sills to adapt it for movement inwardly and outwardly. The shock absorbing mechanism proper, hereinafter described, is mounted within the yoke 14 and is adapted to be supported in operative position by means of a detachable saddle plate 16.

The shock absorbing mechanism proper, as shown, comprises, broadly, a front main combined follower and wedge A; a column-load-sustaining member B which also functions as the rear follower of the mechanism as hereinafter described; twin arranged springs C—C; a spring follower D; a series of relatively stationary friction elements E—E; a series of relatively movable friction elements F—F; a pair of wedge elements G—G; a plurality of anti-friction rollers H—H interposed between the wedge elements G and the friction elements; anti-friction rollers L—L interposed between said wedge elements G and the wedge sections of the follower A; and retainer bolts K—K. The column-load-sustaining member B, sometimes called a casing, a shell, or a chambered follower, depending upon detail changes of construction, is preferably in the form of a malleable casting having upper and lower spaced walls 17—17, integral vertical rear wall 18 cooperating directly with the rear stop lugs 12 as a rear follower and, relatively short, side walls 19—19 at the forward or outer end. As clearly shown in Figures 2 and 3, said member B, at its forward or outer end is of rectangular box-like form, the member B being open on its sides rearwardly of the box-like formation so as to permit of the insertion and removal of the spring follower D and springs C—C. When the follower A engages the member B at the end of a compression stroke, as hereinafter explained, it is evident that the member B acts as a column of very substantial construction to transmit the loads to the underframe of the car through the stop lugs 12. In this connection, it will be noted that all the space available between the stop lugs 12 and the forward edge of the member B is fully occupied, except for such clearances as are necessary in commercial practice and hence no space is allowed to go to waste.

Figures 4, 5, 6, 7, 8, 9:
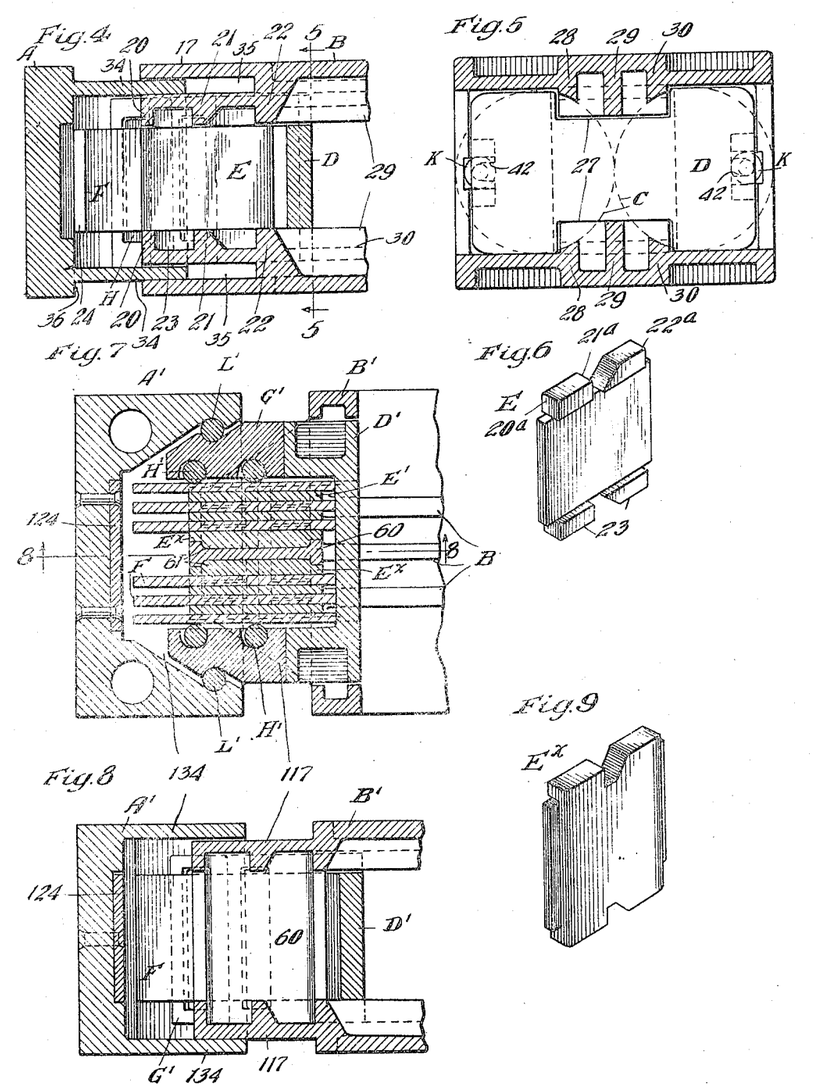
Figure 4 is a longitudinal, sectional view of the mechanism corresponding substantially to the line 4—4 of Figure 3, parts being broken away to better accommodate the view on the sheet.
Figure 5 is a vertical, transverse, sectional view corresponding substantially to the section line 5—5 of Figure 4.
Figure 6 is a detail perspective of one of the relatively stationary friction plates employed with my improvements.
Figures 7, 8 and 9 are views corresponding respectively to Figures 1, 4 and 6 but illustrating another embodiment of the invention, Figure 8 corresponding to the section line 8—8 of Figure 7.
Figures 10, 11, 12, 13:
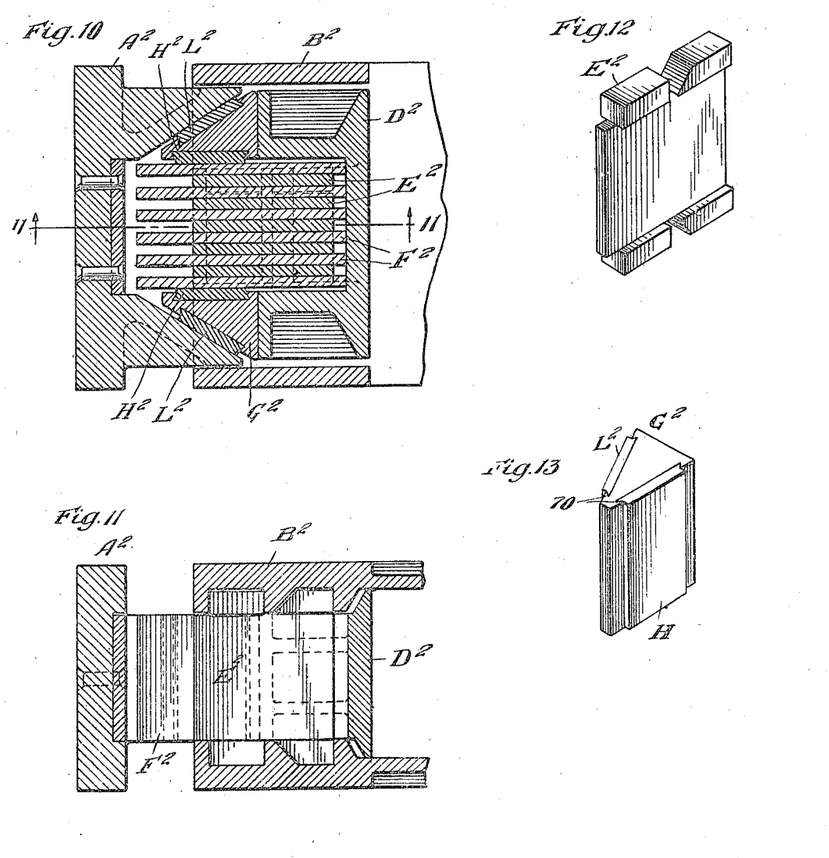
Figures 10, 11 and 12 are views corresponding to Figures 7, 8 and 9, respectively but illustrating a still further embodiment of the invention, Figure 11 being taken on the section line 11—11 of Figure 10.
Figure 13 is a perspective view of one of the wedge elements employed in the construction illustrated in Figures 10, 11 and 12.

Within the box-like section of the member B, the upper and lower walls 17—17, at the central portions only thereof, are provided with three sets of vertically alined shoulders or ribs 20—20, 21—21, and 22—22 as best indicated in Figure 4. The front pair of ribs 20 provides rearwardly facing shoulders whereas the other two sets of ribs 21 and 22 provide forwardly facing sets of shoulders, all of said shoulders extending transversely of the member B, as will be apparent. As will also be apparent, two sets of upper and lower transversely extending guideways or channels are provided by the said sets of ribs 20, 21 and 22. The ribs 20, 21 and 22 are designed to cooperate with the stationary friction elements E, one of which is shown in detail in Figure 6. Each of said elements E is preferably in the form of a friction plate flat throughout its greater portion but enlarged at its top and bottom edges as indicated at 23—23 so that, in vertical section each of said plates E is of more or less I-cross section as best shown in Figure 3. The thickened edges 23 of the plates E are notched and shoulders as indicated at 20ª, 21ª, and 22ª to cooperate respectively with the ribs or shoulders 20, 21 and 22 of the member B. As will be understood by those skilled in the art, the plates E are placed in proper position by inserting them laterally within the channels formed by the ribs 20, 21 and 22. With this construction, the plates E are prevented from any appreciable longitudinal movement with respect to the member B but are freely responsive to laterally or transversely applied pressure, that is, pressure applied substantially perpendicular to the faces of the plates E. Obviously, the greatest load on the plates E occurs during a compression stroke and hence by providing the double sets of forwardly facing shoulders 21, 22, the load on the plates E is distributed over greater areas and danger of the plates E being torn or destroyed thereby minimized. In length the plates E are preferably made between 5" and 5½" and of malleable iron.

The relatively movable friction plates F preferably consist of sections of hardened steel in the form of rectangular plates, the same being preferably approximately 7½" long and of such thickness that, when alternated with the stationary plates E as best shown in Figure 3, the plates E will be slightly spaced along their thickened edges so as to insure that all of the plates, stationary and movable, are freely responsive to lateral pressure during any reasonable amount of wear on said plates. Normally, the ends of the movable plates F project both forwardly and rearwardly of the stationary plates E, as shown in Figure 1 and, furthermore, I prefer to employ one more plate F than the number of plates E so that the outermost plates of the two series, considered as a single group as shown in Figure 1, are so-called movable plates. In order to avoid gouging of the follower A when it actuates the movable plates as hereinafter described, the two outermost movable plates F may be specially formed so as to provide for inwardly turned flanges 24 at their forward ends, said flanges 24 overlapping the forward ends of the other movable plates of the series. In this manner, a hardened steel plate bearing is obtained between the movable plates and the follower A.

The spring follower D is laterally extended so as to provide a bearing for the forward ends of both twin springs C, as clearly shown in Figure 1. The forward side of the follower D normally bears against the inner ends of the movable plates F. On each side of the group of alternated plates, the follower D is formed with preferably integral forwardly extended short columns 25—25, the latter having transverse shoulders 26—26 at their front ends against which are adapted to seat the inner flat ends of the wedge elements G, as shown in Figure 1. By referring to Figures 4 and 5, it will be noted that the follower D is cut away on its top and bottom edges at the center thereof as indicated at 27—27 so as to clear longitudinally extending ribs 28, 29 and 30 on the upper and lower walls of the member B, which ribs, 28, 29 and 30 are employed to increase the column-load-sustaining factor of the member B, as will be understood.

The combined wedge-follower A cooperates with the front stop lugs 11 and drawbar 13 in the usual manner. On its rear or inner side, it is formed with preferably integral rearwardly extending wedge elements 31—31 near the ends thereof, said wedge elements 31 providing opposed rearwardly diverging wedge faces 32—32. Roller stop shoulders 33 are formed at the extreme inner ends of said wedge elements 31 to properly confine the rollers L, as will be understood. It will be noted that the wedge sections 31 telescope within the member B, as shown in Figure 1 and, in order to tie the two wedge sections 31 together and thereby increase the strength of the combined wedge-follower A, I employ upper and lower integral webs 34—34 as best shown in Figures 2, 3 and 4. Said webs 34 also telescope within the member B, the latter having its top and bottom walls 17 suitably longitudinally recessed as indicated at 35—35 in Figure 4 to permit of the telescoping arrangement. With the telescoping arrangement described, it is evident that all the friction plates, rollers and web elements G are completely encased or enclosed to thereby prevent any of said parts from being injuriously affected by weather conditions or the introduction of foreign matter either accidentally or maliciously. This is of extreme importance to a manufacturer or seller since it makes it exceedingly difficult for anyone to tamper with the mechanism either during shipment, during application to a car, or while the mechanism is on the car.

The wedge-follower A is so formed as to provide a rearwardly facing shoulder 36 along all edges thereof, said shoulder being alined with the front edges of the member B and adapted to engage the latter to limit the compression stroke to preferably 2¼".

The wedge elements G are of like construction but oppositely arranged on the opposite sides of the centrally disposed group of alternated friction plates. Each element G is formed on its outer side with a wedge face 37 opposed to and parallel with the wedge face 32 of the corresponding wedge element 31 formed integrally with the follower A. A roller shoulder 38 is formed in each member G, said shoulders being opposed to the other roller shoulders 33 and thereby serving to maintain the rollers L in proper relation with respect to the sets of wedge elements. On its inner side, each wedge element G is provided with a pair of recesses 39—39 within which are accommodated the rollers H, the latter being permitted to roll freely, so far as required, in the operation of the device, with respect to both elements G and the outermost friction plates F. The diameters of the rollers H are such that the wedge elements G are kept slightly spaced from the plates F.

It is highly desirable in commercial practice that a mechanism of the character of this invention be so shipped that the parts cannot become lost or disarranged. To provide for this, I employ preferably two retainer bolts K, one on each side of the mechanism. Each bolt K extends through a suitable perforation 40 in the wedge-follower A, along an alined groove 41 in the wedge element 31 and is then hooked over a recessed inwardly extended flange 42 on the member B. The nut on the outer end of the bolt K will lie within a suitable recess 43 in the follower A. The bolts K, in addition to maintaining the parts in assembled condition, may also be utilized to place the springs under an initial compression so that, as the parts gradually wear, the lost motion which would otherwise result is automatically taken up by the springs expanding slightly.

The operation of the device is as follows, assuming an inward or buffing movement of the drawbar and attention is directed at this point to the fact that there is normally a limited space, preferably a half inch, between the engageable portions of the wedge-follower A and the movable friction elements F. As the wedge-follower A is forced inwardly or rearwardly under the action of the drawbar, the first effect is to produce laterally inwardly directed pressure from the wedge elements 31 to the wedge elements G, the resulting slight relative longitudinal movement therebetween being accommodated without appreciable friction on account of the rollers L. The wedge elements G are picked up and forced rearwardly without moving any of the friction elements since the wedge elements G are free to roll with respect to the plates F. The advance of the wedge elements G forces the spring follower D rearwardly and thereby removes the same from contact with the inner ends of the plates F and places the spring resistance in opposition to the wedging system. The actions just described continue with a gradually increasing wedging action due to the spring resistance until the follower A engages with the outer ends of the plates F. In other words, at the instant the follower A engages with the plates F so as to move the latter, the laterally inwardly directed pressure from both sides will have been imposed upon the centrally disposed group of alternated friction elements. Such pressure obviously cannot be excessive since it is determined by the spring resistance but, on account of the comparatively large number and area of surfaces in frictional contact, a high total frictional resistance will be thereafter afforded during the remainder of the compression stroke. The lateral pressure will be gradually augmented as the plates F are moved inwardly, said pressure being proportional to the degree of compression on the springs C but at no time can the wedging action become excessive. Obviously the desired degree of pressure on the alternated plates may be varied by changing the angles of the wedge faces 32 and 37 and by varying the characteristics of the spring resistance. The arrangement provides for easy action under light blows and for an unusually high total shock absorbing capacity without, however, inducing any excessive peak or ultimate load transmitted to the sills.

Upon removal or discontinuance of the actuating pressure, the springs immediately react through the follower D and inasmuch as the wedge elements 31 and G are antifrictionally mounted with respect to each other and the wedging elements G are antifrictionally mounted with respect to the friction elements, the collapse of the wedge-pressure system is instantaneous, thereby immediately relieving the lateral pressure on the friction elements. The reaction of the springs C through the follower D causes the wedge elements G and wedge-follower A to move outwardly independent of any movement of the plates F until the follower D engages with the inner ends of the plates F whereupon the latter are forced out directly by the follower D and the parts restored to normal position.

Referring next to the construction illustrated in Figures 7, 8 and 9. The column-load-sustaining member is indicated at B'; the combined wedge-follower at A'; the spring follower at D'; the wedge elements at G'; the outer rollers at L'; the inner rollers at H'; the stationary friction elements at E'; and the movable friction elements at F'.

In this form of the invention, the telescoping effect of the follower A' and member B' is obtained by providing webs 134 on the member A' which telescope on the outer side of forward extensions 117 of the top and bottom walls of the member B', said extensions 117 being in trapezoidal outline as viewed in top plan, as best shown in Figure 7.

The arrangement of stationary and movable friction elements is substantially the same as that shown in the first form described except that, to provide a suitable bearing surface between the follower A' and the movable plates F', I use a steel plate insert 124 riveted to the inner side of the follower A' opposite the outer ends of the plates F', all of the latter being of like construction and no specially flanged plate being necessary.

The member B', as shown, is formed with a centrally disposed partition or web 60 extending vertically and integrally uniting the extensions 117—117, and the stationary friction plates which are immediately in contact with said web 60, the same being indicated at E$^x$, are laterally enlarged as indicated at 61 to conform to the section of the web 60, as shown in Figure 7.

The operation of the construction just described is the same as that for the previously described construction and need not be repeated.

In the arrangement shown in Figures 10 to 13 inclusive, the column-load-sustaining member is indicated at B$^2$; the combined wedge-follower at A$^2$; the spring follower at D$^2$; the stationary friction elements at E$^2$; the movable friction elements at F$^2$; and the wedge elements at G$^2$.

Except for certain features of the telescoping arrangement (which might be employed if desired) the construction illustrated in Figures 10 to 13 is the same in general arrangement and operation as that of the construction illustrated in Figures 1 to 6 with, however, the substitution of a different means for obtaining the anti-frictional relation between the wedge elements and between the wedge elements and the friction elements. In the arrangement illustarted in Figures 1 to 6, rollers are employed whereas in the arrangement of Figures 10 to 13, I prefer to employ anti-frictional metal inserts L$^2$ and H$^2$. These inserts may be of any desired material such as phosphor-bronze and preferably machined so as to reduce friction between said inserts and opposed surfaces to a minimum. I prefer that the anti-friction metal inserts L$^2$ and H$^2$ be both applied to the wedge elements G$^2$ and to reduce the cost of manufacture, the wedge elements G$^2$ may be formed with undercut grooves 70 and the inserts correspondingly formed so that the inserts are applied by slipping the same lengthwise within said grooves 70.

The operation of the construction shown in Figures 10 to 13, as above indicated, is the same as that of the construction illustrated in Figures 1 to 6 and need not be detailed. The construction of Figures 10 to 13 possesses a certain advantage, regarding manufacturing cost, over the other forms described in that none of the castings employed in the construction of Figures 10 to 13 need be case hardened but may be formed as malleable castings throughout, whereas in the construction shown in Figures 1 to 6, the seats for the rollers L and H would ordinarily have to be case hardened in order to avoid indentation of the metal when the rollers press thereupon.

I have herein shown and described what I consider the preferred manner of carrying out the invention, but the same is merely illustrative and I contemplate all changes and modifications that come within the scope of the claims appended hereto and in this connection, I am well aware that the column-load-sustaining member may assume considerably different forms than those herein illustrated without changing its function.

I claim:

1. In a friction shock absorbing mechanism the combination with a column-load-sustaining member; of a plurality of alternated relatively movable and stationary friction elements mounted on said member; a follower, said member and follower being movable relatively toward and from each other; a combined restoring and cushioning spring resistance; and lateral-pressure-creating means disposed and operating on the outer sides of said friction elements and arranged to exert opposite and inwardly directed lateral pressure on said elements upon relative approach of said follower and member.

2. In a friction shock absorbing mechanism, the combination with a column-load-sustaining member; of a plurality of alternated relatively movable and stationary flat friction plates carried by said member, a main follower, said member and follower being movable relatively toward and from each other; a spring resistance; and lateral-pressure-creating means operating against the outer sides of said elements and arranged to exert oppositely inwardly directed lateral pressure on said elements during relative approach of said follower and member.

3. In a friction shock absorbing mechanism, the combination with a column-load-sustaining member; of a plurality of friction elements mounted on said member and held against movement longitudinally thereof; a follower movable relatively toward and from said member; a plurality of friction elements intercalated with respect to said first named friction elements and adapted to be actuated by said follower during relative approach of said follower and member; a spring resistance; and means for augmenting the friction between said elements upon relative approach of said follower and member, said means being arranged to exert inwardly directed pressure on said elements.

4. In a friction shock absorbing mechanism, the combination with a column-load-sustaining member; of a plurality of flat friction plates mounted on said member and held against movement longitudinally thereof; a follower movable relatively toward and from said member; a plurality of flat friction plates intercalated with respect to said first named friction plates and arranged to be actuated by said follower upon approach of the latter toward said member; a spring resistance; and means for augmenting friction between said friction elements during approach of said follower toward said member, said means being arranged to exert inwardly and oppositely directed forces laterally against said elements.

5. In a friction shock absorbing mechanism, the combination with two members relatively movable toward and from each other and each adapted to act as a follower in cooperation with stop-acting means; of a set of friction elements carried by one of said members and held against movement lengthwise thereof; a second set of friction elements intercalated with respect to those of the first named set and movable relatively to said member carrying the first named set of elements; means arranged to augment the pressure between said sets of elements upon relative approach of said members; a spring resistance; and inter-fitting telescoping sections on said two members enclosing and concealing said friction elements in all conditions of the mechanism, each member having one of said sections integral therewith.

6. In a friction shock absorbing mechanism, the combination with two follower-acting members relatively movable toward and from each other, one of said members having a spring chamber therein; of a set of friction elements carried by one of said members and held against movement lengthwise thereof; a second set of friction elements intercalated with respect to those of the first named set and movable relatively to said member carrying the first named set of elements; means arranged to augment the pressure between said elements upon relative approach of said follower-acting members; a spring resistance mounted within said chamber; and cooperating telescoping sections formed on said two members enclosing and concealing said friction elements.

7. In a friction shock absorbing mechanism, the combination with a column-load-sustaining member; of a plurality of intercalated relatively movable and stationary friction elements, said elements being in a single group centrally disposed in the center line of the mechanism; a follower, said member and follower being movable relatively toward and from each other; a spring resistance; lateral-pressure-creating means separate from said elements arranged on opposite sides of said group of friction elements and arranged to exert inwardly directed lateral pressure from both sides thereof on said group of elements during relative approach of said follower and member; and anti-friction releasing means interposed between said pressure-creating means and the friction elements.

8. In a friction shock absorbing mechanism, the combination with a column-load-sustaining member; of a plurality of alternated relatively movable and stationary friction elements mounted on said member; a follower, said member and follower being movable relatively toward and from each other; a combined restoring and cushioning spring resistance; and lateral-pressure-creating means disposed and operating on the outer sides of said friction elements and arranged to exert opposite and inwardly directed lateral pressure on said elements upon relative approach of said follower and member, said means including, wedge elements rigid with said follower and independent wedge elements between the friction elements and the follower-wedge elements.

9. In a friction shock absorbing mechanism, the combination with a column-load-sustaining member; of a plurality of intercalated relatively movable and stationary friction elements, said elements being in a single group centrally disposed in the center line of the mechanism; a follower, said member and follower being movable relatively toward and from each other; a spring resistance; and lateral-pressure-creating means arranged on opposite sides of said group of friction elements and arranged to exert inwardly directed lateral pressure from both sides thereof on said group of elements during relative approach of said follower and member, said means including, wedge elements rigid with said follower and independent wedge elements between the friction elements and the follower-wedge elements.

10. In a friction shock absorbing mechanism, the combination with a column-load-sustaining member; of a plurality of friction elements mounted on said member and held against movement longitudinally thereof; a follower movable relatively toward and from said member; a plurality of friction elements intercalated with respect to said first named friction elements and adapted to be actuated by said follower during relative approach of said follower and member; a spring resistance; and means for augmenting the friction between said elements upon relative approach of said follower and member, said means being arranged to exert inwardly directed pressure on said elements, said means including, wedge elements rigid with said follower and independent wedge elements between the friction elements and the follower-wedge elements.

11. In a friction shock absorbing mechanism, the combination with two follower-acting members relatively movable toward and from each other, one of said members having a spring chamber therein; of a set of friction elements carried by one of said members and held against movement lengthwise thereof; a second set of friction elements intercalated with respect to those of the first-named set and movable relatively to said member carrying the first named set of elements; means arranged to augment the pressure between said elements upon relative approach of said follower-acting members; a spring resistance mounted within said chamber; cooperating telescoping sections formed on said two members enclosing and concealing said friction elements; and means extending between said follower-acting members limiting the degree of separation thereof adapted to maintain all of the parts in assembled relation.

12. In a friction shock absorbing mechanism, the combination with a column-load-sustaining member; of a plurality of intercalated relatively movable and stationary friction elements, said elements being arranged in a single group centrally disposed in the center line of the mechanism; a main follower movable relatively toward and from said member; a spring resistance; a spring follower interposed between the inner ends of said movable friction elements and said spring resistance, said spring follower being laterally extended to each side of said group; and duplicated lateral-pressure-creating means on each side of said group of friction elements, said laterally extended portions of the spring follower being interposed between the respective pressure-creating means and the spring resistance.

13. In a friction shock absorbing mechanism, the combination with a column-load-sustaining member; of a series of relatively stationary friction elements; a series of relatively movable friction elements intercalated with respect to said stationary friction elements and the two series together constituting a single centrally disposed group; of a follower movable toward and from said member, said follower being provided on the inner side thereof with opposed integrally formed wedge elements presenting inwardly diverging wedge faces; a spring resistance; and independent wedge elements, one on each side of said group of friction elements, said independent wedge elements being interposed between the spring resistance and the corresponding wedge elements of the follower.

14. In a friction shock absorbing mechanism of the character described, the combination with a column-load-sustaining member having a box-like section at one end and a transverse wall at its other end with a spring chamber therebetween; of a series of friction plates mounted within said box-like section centrally thereof and freely responsive to laterally applied pressure; a series of relatively movable friction plates intercalated with respect to said stationary friction plates and extending outwardly beyond the latter; a spring resistance within said spring chamber; a follower interposed between said spring resistance and the inner ends of said movable friction plates, said follower having forwardly extended columns on each side of the group of intercalated plates; a follower movable relatively toward and from said member, said follower having integral inwardly extended wedges on opposite sides thereof with the wedge faces diverging inwardly, said follower being normally slightly spaced from the adjacent ends of the movable plates; and independent wedge elements, one on each side of the group of intercalated plates, each wedge element bearing at its inner end against one of said columns of the spring follower and adapted to cooperate with the corresponding follower-wedge.

15. In a friction shock absorbing mechanism of the character described, the combination with a column-load-sustaining member having a box-like section at one end and a transverse wall at its other end with a spring chamber therebetween; of a series of friction plates mounted within said box-like section centrally thereof and freely responsive to laterally applied pressure; a series of relatively movable friction plates intercalated with respect to said stationary friction plates and extending outwardly beyond the latter; a spring resistance within said spring chamber; a follower interposed between said spring resistance and the inner ends of said movable friction plates, said follower having forwardly extended columns on each side of the group of intercalated plates; a follower movable relatively toward and from said member, said follower having integral inwardly extended wedges on opposite sides thereof with the wedge faces diverging inwardly, said follower being normally slightly spaced from the adjacent ends of the movable plates; independent wedge elements, one on each side of the group of intercalated plates, each wedge element bearing at its inner end against one of said columns of the spring follower and adapted to cooperate with the corresponding follower-wedge; anti-friction releasing means interposed between each independent wedge element and the adjacent friction plate; anti-friction releasing means interposed between each independent wedge element and its corresponding follower-wedge; and telescoping portions on said follower and member arranged to conceal and protect said intercalated friction elements.

In witness that I claim the foregoing, I have hereunto subscribed my name this 29th day of March, A. D. 1921.

JOHN F. O'CONNOR.

Witnesses:
 CARRIE GAILING,
 UNA C. PERIN.